United States Patent [19]

Brown

[11] Patent Number: 4,693,814
[45] Date of Patent: Sep. 15, 1987

[54] WATER TREATMENT APPARATUS

[75] Inventor: Keith E. Brown, Solon, Ohio

[73] Assignee: Kinetico, Inc., Newbury, Ohio

[21] Appl. No.: 646,953

[22] Filed: Sep. 4, 1984

[51] Int. Cl.$^4$ .......................... C02F 1/42; C02F 9/00; B01J 49/00

[52] U.S. Cl. ..................... 210/88; 210/191; 210/284; 210/288

[58] Field of Search ............ 210/136, 190, 191, 257.1, 210/258, 259, 261, 266, 269, 284, 670, 672, 673, 678, 687, 140, 143, 88, 90, 97, 98, 288; 417/313, 437, 475

[56] References Cited

U.S. PATENT DOCUMENTS

| | | | |
|---|---|---|---|
| 2,145,901 | 2/1939 | Shoemaker | 210/722 |
| 2,383,422 | 8/1945 | Singleton | 417/437 |
| 2,902,155 | 9/1959 | Lundeen | 210/190 |
| 3,216,931 | 11/1965 | Dennis et al. | 210/673 |
| 3,382,983 | 5/1968 | Stewart | 210/266 |
| 3,891,552 | 6/1975 | Prior et al. | 210/190 |
| 4,071,446 | 1/1978 | Kunin | 210/670 |
| 4,116,860 | 9/1978 | Kunin | 252/192 |
| 4,196,081 | 4/1980 | Pavia | 210/284 |
| 4,219,413 | 8/1980 | Jackson et al. | 210/96.1 |
| 4,228,000 | 10/1980 | Hoeschler | 210/190 |
| 4,298,025 | 11/1981 | Prior et al. | 210/190 |
| 4,298,468 | 11/1981 | Heskett | 210/190 |
| 4,336,134 | 6/1982 | Prior | 210/190 |
| 4,430,228 | 2/1984 | Paterson | 210/665 |

Primary Examiner—Ivars Cintins
Attorney, Agent, or Firm—Watts, Hoffmann, Fisher & Heinke Co.

[57] ABSTRACT

A water treatment system including a pair of tank assemblies 110, 112 interconnected by a valve module 114 for controlling the communication of water to be treated to an on-line tank and the regeneration of an exhausted tank. Each tank assembly includes a compartment containing a water softening resing 125 and a compartment centering an iron filter media. The valve module is connected to a regeneration solution reservoir 150 by brine conduits 164, 220. A pumping assembly 192 automatically transfers a predetermined amount of a supplemental regenerant fluid from a well 168 into the regeneration solution reservoir at the conclusion of a regeneration cycle. The pumping assembly includes upper and lower chambers 194a, 196a communicating with the supplemental regenerant fluid reservoir 168 and brine supply conduits 164, 220 respectively. The lower chamber 196a contracts and expands in response to the depressurization and pressurization of the brine conduits and produces attendant expansion and contraction in the upper chamber 194a. The upper chamber draws a predetermined amount of regenerant fluid from the reservoir 168 and injects the fluid into the regeneration solution reservoir 150. Check valves 186, 202 control the direction of flow of the regenerant fluid from the regenerant well 168.

18 Claims, 3 Drawing Figures

WATER TREATMENT APPARATUS

TECHNICAL FIELD

The present invention relates generally to water treatment and in particular to a new and improved water softening apparatus and method for treating water having a high iron content.

BACKGROUND ART

Water softeners of the "ion exchange" type typically include a resin tank through which hard water passes to exchange its "hard" ions of calcium and magnesium for the "soft" sodium ions from the resin bed. Regeneration of the resin bed is required periodically to remove the accumulation of hard ions and replenish the supply of soft ions. Regeneration is typically affected by flushing a brine solution through the resin bed. A water softener of this type is more fully described in U.S. Pat. No. 3,891,552 issued June 24, 1975 to William Pryor and James W. Kewley, entitled CONTROL VALVE FOR WATER SOFTENERS, the disclosure of which is incorporated herein by reference.

Modern water softeners of the type disclosed in U.S. Pat. No. 3,891,552 typically employ a brine tank which includes a reservoir and supply of salt disposed at a level above the bottom of the reservoir. A tube connected to a source of water establishes a path for water to flow to the reservoir. Upon the attainment of a predetermined level in the reservoir, the water reacts with the salt supply to produce a source of brine for regeneration of the resin bed. When regeneration is required, the brine is aspirated through the same tube that supplied water to the reservoir. The amount of water introduced to the brine tank after the regeneration cycle and the amount of brine aspirated from the tank during a regeneration cycle is controlled by a brine valve mechanism.

Commercially available water softeners generally include one or two tanks which contain the softening chemicals that form the resin beds. In a two tank water softener, one tank is regenerated and kept "off-line" while the other tank is "on-line". A control valve controls the communication of the tanks with the household water supply and controls the timing and sequence of regeneration. One such system and control valve is disclosed in U.S. Pat. No. 3,891,552. An improved control valve is described in U.S. Pat. No. 4,298,025. Both of these patents are owned by the present assignee and are herein incorporated by reference.

A prior art resin tank typically comprises an elongate cylinder in which the ion exchange resin is contained. A conduit, often called a riser pipe, extends downwardly from the top of the tank. A filter screen, mounted at the end of the conduit prevents the entry of resin into the conduit. An opening is formed in the top of the tank for discharging or admitting fluid depending on the direction of flow.

In many applications, the prior art water softeners such as the one described in the above referenced patent, performed satisfactorily. However, in some areas of the country "problem water" is encountered which is not easily treated by conventional water softening apparatus. In particular, in some regions, the water has a high iron content and low pH. When a typical water softening apparatus is used to treat this water the result is still considered unacceptable or only marginally acceptable. Although methods and apparatus are known for treating water having a high iron content and low pH, many if not most are considered uneconomical for home use or use a process that the average homeowner is not equipped to handle.

DISCLOSURE OF THE INVENTION

The present invention provides a new and improved water treatment apparatus which not only softens water, but is also capable of removing high levels of iron from the water and of adjusting the pH of the treated water to an acceptable neutral range of 6.8-8.0.

In accordance with the invention, the water treatment system includes an ion exchange bed that is periodically regenerated, an iron filter for filtering the water to be treated prior to passage through the ion exchange bed, a reservoir for regeneration solution that is used to regenerate an exhausted ion exchange bed, and a control apparatus for determining the frequency at which the resin bed is regenerated. According to the invention, the iron filter is flushed during a regeneration cycle of the resin bed in order to flush out the accumulated iron.

In the preferred and illustrated embodiment, the resin bed and iron filter are contained in serially connected tanks. Preferably the water to be treated enters the tank containing the iron filter first and then exits and enters the tank containing the resin bed. After passing through the bed, the treated water leaves the ion exchange tank through an outlet connected to the household water supply.

The treating system also includes a source of regeneration solution that is passed through the ion exchange tank during the regeneration cycle in order to reactivate the ion exchange resin. In accordance with the invention, the regeneration solution is a composite regenerant. To achieve this feature, the system includes a conventional brine tank and a brine conduit communicating the brine tank tank with a control valve. During a regeneration cycle, solution from the brine tank is conveyed to the resin bed being regenerated. In accordance with a feature of the invention, the system also includes a vessel containing a supplemental regenerant fluid and a metering arrangement for periodically adding the regenerant to the brine solution to create a composite regeneration solution.

In the preferred embodiment, the metering arrangement responds to the termination of brine solution flow during the regeneration cycle and adds a predetermined quantity of a supplemental regenerant fluid to the brine tank. In the illustrated embodiment, the control apparatus for controlling the water treatment system preferably comprises a valve of a type descibed in U.S. Pat. Nos. 3,891,552 and/or 4,298,025. This type of control valve includes a venturi arrangement that is activated during the regenration cycle and aspirates regeneration solution into the tank being regenerated. In particular, the brine conduit is connected to the throat of the venturi. During the regeneration cycle, water is communicated to the venturi which draws regeneration solution from the brine conduit as it passes through the venturi throat. The water and regeneration solution is then conveyed to the tank being regenerated. Regeneration solution travels from the brine tank to the venturi as long as water continues to flow through the venturi and as long as the brine control valve remains open. When a predetermined amount of brine solution has left the brine tank, the brine control valve closes and prevents further brine solution from entering the control valve.

In accordance with feature of the invention, a metering arrangement is disclosed which takes advantage of the suction generated by the venturi. In accordance with this feature, a housing is disclosed which includes a flexible diaphragm captured between mating housing members. A pair of expansible chambers is defined on either side of the diaphragm. One of these chambers is connected to the brine conduit whereas the other chamber is connected to the vessel containing the supplemental regenerant fluid by a regenerant fluid supply conduit. When the brine control valve terminates the flow of brine solution into the brine conduit, the suction generated by the venturi causes the chamber connected to the brine conduit to contract. The resulting expansion of the adjoining chamber (connected to the regenerant vessel) causes regenerant fluid to be drawn from the vessel and into the chamber. In normal operation, the brine conduit (which communicates with the one chamber) is pressurized when the regeneration cycle is terminated. Check valves prevent fluid flow from the conduit into the brine reservoir. The pressurization of the brine conduit causes the first chamber to re-expand thus causing the adjacent chamber to expel the stored regenerant fluid. Check valves placed in the associated conduit prevent the expelled regenerant from returning to the regenerant vessel. Consequently, the expelled fluid is discharged into the brine reservoir thus creating a composite regeneration solution in the brine reservoir.

The addition of the supplemental regenerant fluid to the brine reservoir occurs automatically at the conclusion of each regeneration cycle and is accomplished without operator intervention. The resulting composite regeneration solution enhances the regeneration of the resin bed without significantly adding cost to the overall system.

In accordance with another feature of the invention, the tanks containing the resin bed and iron filter are interconnected directly and stacked vertically. In accordance with this feature, the resin tank includes an opening at each end. The tank containing the iron filter, however, includes only a single opening that is coupled to one end of the ion exchange tank. Once connected, the tanks are axially aligned thus enabling a single riser tube to extend from the top of the ion exchange tank and into the iron filter tank. The opening of the riser tube is located near the base of the iron filter tank and forms an inlet to the tank structure such that water to be treated communicated to the riser tube enters the overall tank structure at or near the bottom of the iron filter. From there it travels upwardly through the iron filter, is discharged from the top of the iron filter tank and immediately enters the bottom of the ion exchange tank. The water then travels through the ion exchange bed and is discharged to an outlet at the top of the ion exchange tank.

The iron filter preferably comprises a floating media such as "hollow macrospheres" sold by the 3M Company. By using a floating filter media, during normal operation, the media tends to rise toward the top of the iron filter tank. The iron filtered from the water then tends to accumulate at the bottom of the filter media. In the preferred operation, downflow regeneration is employed so that regeneration solution and backwash water enters the top of the resin tank and exits the bottom of the iron filter tank. During the backwash process the iron accumulated by the iron filter is easily flushed out of the iron filter tank because the accumulated iron is simply pushed downwardly from the bottom of the filter media and travels out the riser tube.

It should be apparent that a new and improved water treatment system is disclosed. The system not only softens hard water but also removes iron from "problem water" and adjusts its pH to a neutral range. The iron filter for removing the iron from the water being treated, prior to entering the ion exchange bed, is flushed automatically during a regeneration cycle to remove the accumulated iron.

Additional features of the invention will become apparent and a fuller understanding obtained by reading the following detailed description made in connection with the accompanying drawings.

BEST MODE FOR CARRYING OUT THE INVENTION

Figure 1:
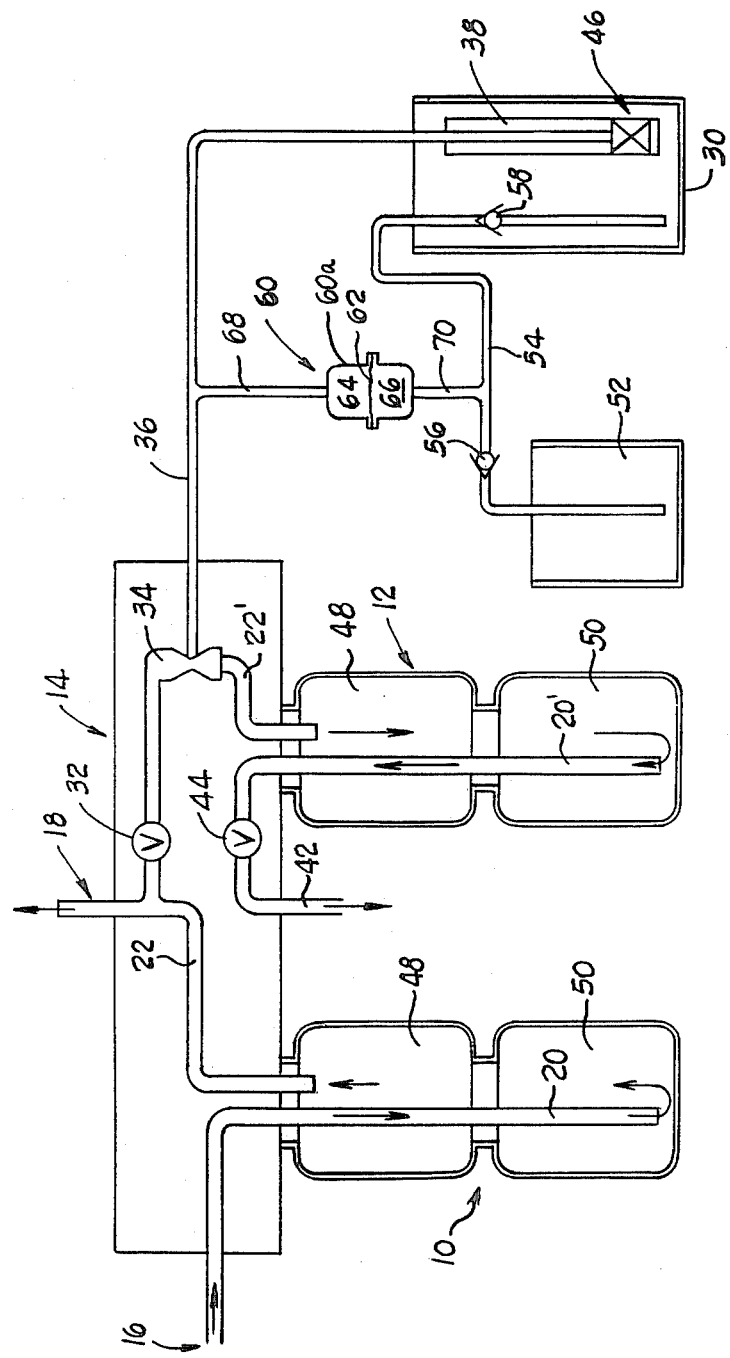
FIG. 1 is a schematic representation of a water softening system embodying the present invention.

FIG. 1 schematically illustrates a water treatment system constructed in accordance with the preferred embodiment of the invention. The system includes a pair of resin tank assemblies 10, 12 interconnected by a control valve module 14. The control valve module 14 can take many forms. In the preferred embodiment, the control valve module is the type described in U.S. Pat. Nos. 4,298,025 and 3,819,552.

As fully described in the above referenced patents, the control assembly 14 controls the communication of a source of water to be treated, indicated generally by the reference character 16 with the treatment tank assemblies 10, 12; the communication of the tanks with an outlet indicated by the reference character 18; and, the regeneration of an exhausted tank assembly. In FIG. 1 the fluid flow paths are illustrated for a condition in which the tank assembly 10 is "on-line" and the tank assembly 12 is being regenerated. As fully described in the above referenced patents, the control valve 14 also includes passages, valves, etc. (not shown) for placing the tank assembly 12 "on-line" and for regenerating the tank assembly 10. As seen in FIG. 1, the on-line tank assembly 10 receives water from the inlet 16. The water to be treated flows down a riser pipe 20 and enters the tank assembly near the bottom. From there the water moves upwardly traveling through the resin (not shown) in the tank assembly, exiting near the top and into a tank outlet passage 22 connected to the outlet 18. It should be understood that the control module 14 includes valving for controlling the communication of the inlet 16 with the inlet pipe 20 and the communication of the tank outlet passage 22 with the outlet 18. To simplify the explanation, the fluid circuits and valves have been omitted.

The tank assembly 12 is regenerated by passing a regeneration solution, in a counterflow direction, through the resin. In many if not most conventional, residential softening systems, a brine reservoir 30 forms a source of regeneration solution. During regeneration, a valve 32, indicated schematically, opens to communicate softened water in the outlet passage 22 with a venturi 34. The opposite end of the venturi 34 is connected to the outlet 22' of the tank being regenerated, in this case the tank assembly 12. The throat 34a of the venturi 34 is connected to a brine conduit 36 that extends into fluid communication with a brine well 38 located in the brine reservoir 30. The action of water passing through the venturi 34 draws or aspirates brine solution from the brine reservoir. The brine solution is entrained in, and diluted by, the softened water and flows through the tank assembly 12. Near the bottom of the tank assembly 12, the regeneration solution enters the inlet pipe 20' and is dumped to a drain, indicated schematically by the reference character 42. The inlet pipe 20' is connected to the drain 42 by the drain valve 44, indicated schematically. The amount of brine communicated to the contol module 14 is controlled by a brine valve 46 (indicated schematically). An example of a brine valve is disclosed in U.S. Pat. No. 4,336,134, which is owned by the present assignee, and is herein incorporated by reference.

After the flow of brine solution is terminated, softened water continues to flow through the tank assembly 12 to "backwash" the resin or in other words to rinse the brine solution from the regenerated resin.

At the end of a regeneration cycle, the flow of wash water to the tank assembly being regenerated (in this case tank assembly 12) is terminated and the brine reservoir is refilled with water, usually under the control of the brine valve, to replenish the regeneration solution used during the previous regeneration cycle. The replenishment is usually controlled by the brine valve 46. With the illustrated and preferred control module 14, the replenishment of the brine reservoir 30 is achieved through the brine conduit 36. It should be apparent that if the drain valve 44 is closed to prevent discharge of fluid to the drain 42, the flow of softened water through the venturi will terminate; if the brine valve 46 is opened, the flow of softened water will proceed from the throat 34a of the venturi to the brine reservoir 30 by way of the brine conduit 36.

In accordance with the preferred embodiment, each tank assembly 10, 12 includes a water softening resin bed and an iron filter bed 48, 50 respectively. In the preferred embodiment, the beds are housed in a pair of serially connected tanks 10a, 10b and 12a, 12b respectively.

In accordance with the invention, a method and apparatus for creating a composite regeneration solution is disclosed. In particular, a supplemental regenerant fluid is periodically added to the brine solution in the brine tank 30. In the preferred embodiment, the supplemental regenerant fluid is added after each regeneration cycle.

In accordance with this feature of the invention, the system includes a reservoir 52 for the supplemental regenerant fluid. A supply conduit 54 communicates with the brine reservoir 30 and includes a pair of check valves 56, 58. A pump 60 meters a predetermined amount of regenerant fluid from the reservoir 52 into the brine reservoir 30 at the end of each regeneration cycle.

In the preferred and illustrated embodiment, the pump 60 comprises a housing 60a and a diaphragm 62 that divides the housing into upper and lower chambers 64, 66. The upper chamber 64 communicates with the brine conduit 36 via conduit 68. The lower chamber communicates with the regenerant supply conduit 54 via conduit 70. The conduit 70 is connected to the regenerant supply conduit 54 intermediate the check valves 56, 58.

In the preferred method, the pressurization and depressurization of the brine conduit 36 during the regeneration cycle operates the pump 60. During the "brining" portion of the regeneration cycle, brine solution flows from the brine well 38 to the venturi 34. When sufficient brine has been dispensed, the brine valve 46 closes to terminate the flow of regeneration solution. The termination of brine flow produces a suction pressure in the brine conduit 36 which acts on the diaphragm 62 and contracts the upper chamber 64. Upward movement of the diaphragm 62 in turn causes expansion of the lower chamber 66 and produces a suction pressure in the regenerant supply line 54. The check valve 58 prevents flow out of the brine reservoir 30; the check valve 58 opens to allow the flow of supplemental regenerant fluid from the regenerant reservoir 52 into the chamber 66. As discussed above, at the conclusion of the regeneration cycle, the brine conduit 36 becomes pressurized as water flows through the line to refill the brine reservoir 30 (via the throat 34a of the venturi 34). The pressurization of the brine conduit 36 expands the chamber 64 thus forcing the stored regenerant fluid from the lower chamber 66. Since the check valve 56 is oriented to prevent flow from the conduits 70, 54 into the regenerant reservoir 52, the expelled regenerant fluid is discharged into the brine reservoir 30. It should be apparent, that a pre-determined quantity of the supplemental regenerant fluid is automatically injected into the brine reservoir 30, at the conclusion of each regeneration cycle thus creating a composite regeneration solution in the reservoir.

Figure 2:
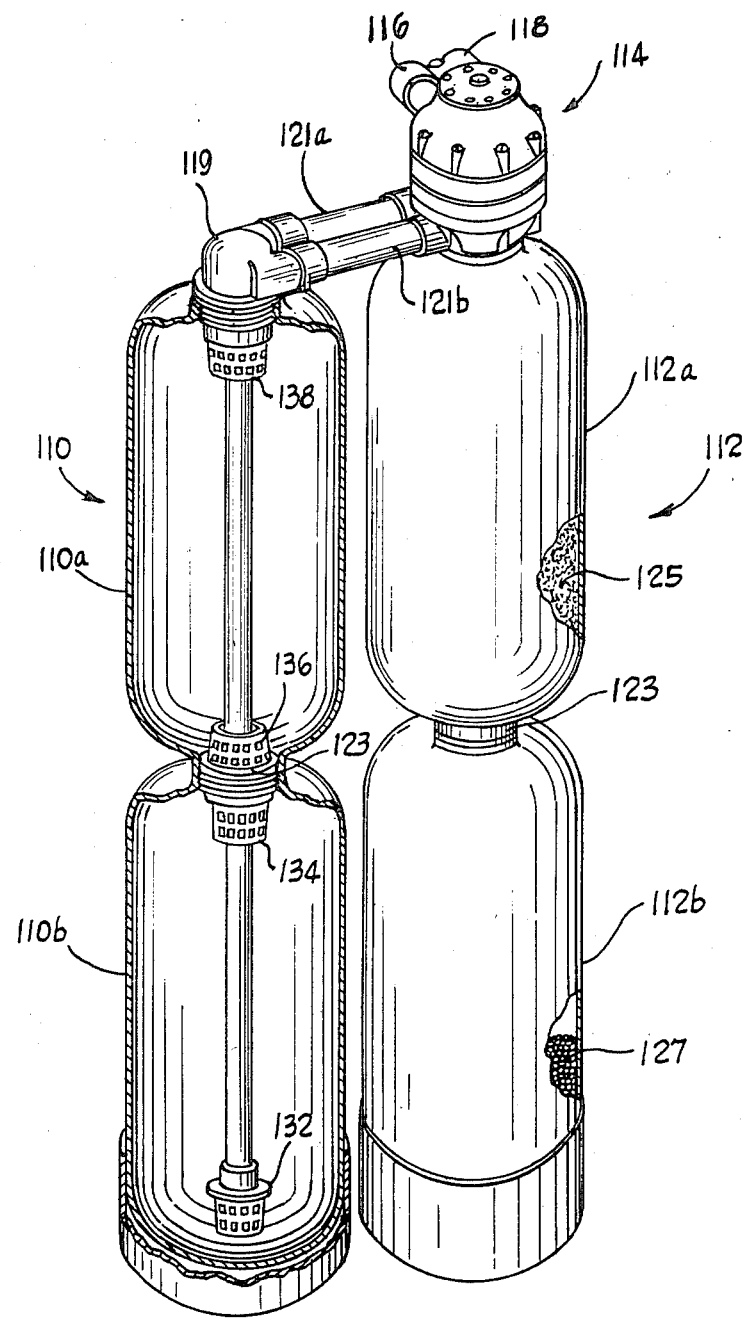
FIG. 2 is an elevational view, partly in section, of a pair of treatment tanks forming part of the present invention; and, FIG. 3 is an exploded view of a brine tank and supplemental regeneration apparatus, constructed in accordance with the preferred embodiment of the invention.
Figure 3:
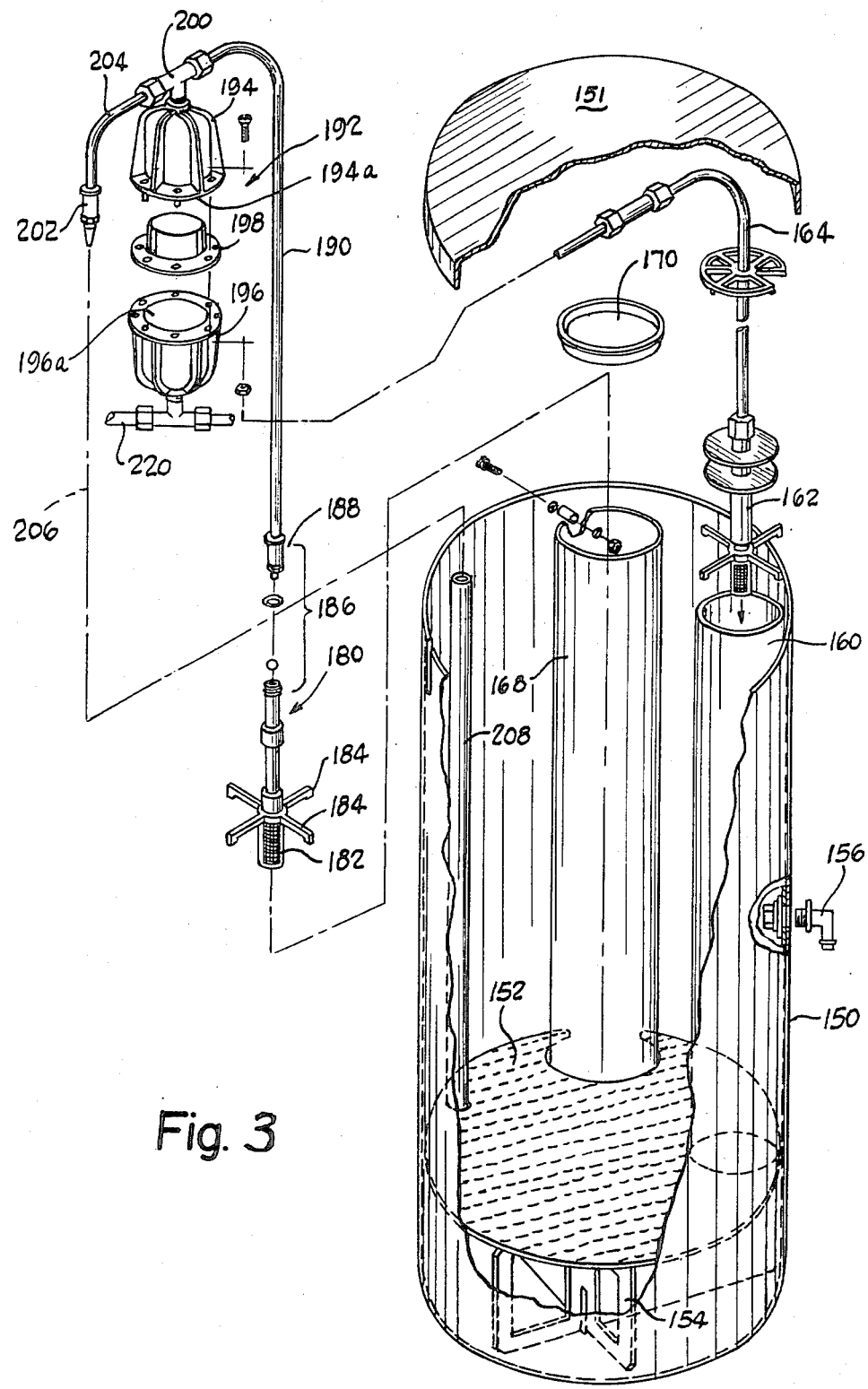

Turning now to FIGS. 2 and 3, the construction of a water treatment system embodying the present invention is illustrated. Referring in particular to FIG. 2, the system includes a pair of tank assemblies 110, 112 interconnected by a control valve assembly 114. The control valve assembly 114 includes an inlet 116 for water to be treated and an outlet 118 for discharging treated water into the household water supply (not shown). The tank assembly 110 is interconnected with the tank 112 by a fitting 119 and a pair of parallel conduits 121a, 121b. As fully described in U.S. Pat. Nos. 3,891,552 and 4,298,025, the control valve assembly 114 controls the regeneration of the tank assemblies 110, 112 and determines which of the tank assemblies is "on line".

In the preferred embodiment, the tank assemblies 110, 112 are identical. The tank assembly 110 comprises a pair of vertically disposed tanks 110a, 110b interconnected by a fitting 123. Similarly, the tank assembly 112 comprises serially connected tanks 112a, 112b also interconnected by a fitting 123.

In the preferred and illustrated construction, the top tank houses a water softening resin 125 whereas the lower tank houses an iron filter media 127. For purposes of explanation the resin 125 and filter media 127 are shown only in the tank assembly 112. It should be understood that the tank assembly 110 also includes the resin and filter media.

In the preferred embodiment, when a tank is "on line", service is "up flow". In particular, water to be treated enters near the bottom of the lower tank, e.g., tank 110b, travels upwardly through both tanks and exits at the top of the upper tank, e.g., tank 110a. In accordance with the preferred construction, a riser tube 130 extends downwardly through both tanks 110a, 110b and opens at the bottom of the tank 110b. The tank assembly 112 includes a similar riser tube. The fitting 119 includes passages for communicating the conduit 121a with the riser pipe 130. A filtering screen 132 is mounted at the end of the riser pipe to prevent material/resin in the tank from entering the riser pipe 130.

Fluid to be treated enters a tank assembly at the bottom of the lower tank. When the tank assembly 110 is active or "on-line", the water to be treated exits the riser pipe 130 through the filtering screen 132 and flows upwardly through the iron filter material 127. The connector 123 which couples the tanks 110a, 110b together, also includes upper and lower filtering screens 134, 136 and passages (not shown) for placing the tanks in serial, fluid communication. The water leaves the tank 110b through the coupling 123 and enters the upper tank 110a, which in the preferred embodiment, contains the water softening resin 125. The water then continues its upward travel through the upper tank 110a and leaves the upper tank through a filtering screen 138a mounted to the fitting 119. The screens 134, 136 and 138 prevent the filter material 127 and resin 125 from intermixing and/or from leaving the tanks.

In the preferred embodiment, the control valve 114 which is more fully described in U.S. Pat. No. 4,298,025 causes the regeneration of an exhausted tank assembly to occur in a downflow direction. Regeneration solution enters at the top of the upper tank (e.g. tank 110a), travels downwardly through the upper and lower tanks 110a, 110b and exits by way of the riser tube 130. By counterflowing the regeneration fluid, the regeneration of the water softening resin 125 is enhanced and, more importantly, iron accumulated by the iron filter material 127 in the lower tank 110b is more easily and more completely flushed from the filtering bed in tank 110b.

Turning now to FIG. 3, the regeneration solution reservoir (element 30 in FIG. 1) includes an open top tank 150 and a complemental tank lid 151. A screen or perforate plate 152 is supported above the bottom of the reservoir 150 by a support 154. As is known in the art, the perforate plate 152 supports a supply of salt (not shown) above the bottom of the reservoir. Water is added to the reservoir until a portion of the salt supply is submerged. The submerged salt then dissolves to form a brine solution. A fitting 156 is mounted in the side of the reservoir and forms an overflow to prevent an excess water level from developing in the reservoir.

A brine or regeneration solution well 160, formed by a tubular member mounted vertically along the wall of the reservoir, extends through the perforate plate and opens at or near the bottom of the reservoir. A brine valve 162 which may be the form shown in U.S. Pat. No. 4,336,134 is positioned at the lower end of the brine wall and controls the flow of regeneration solution out of the reservoir 150 and the inflow of replacement water into the reservoir. The brine valve 162 is connected via a conduit 164 to the control valve apparatus 114. (A schematic representation of the connection is shown in FIG. 1 and denoted as conduit 36). As explained above and shown in FIG. 1, the conduit 164 is connected to a venturi mechanism in the control valve 114 which becomes operative to cause the aspiration of regeneration solution during a regeneration cycle.

As also seen in FIG. 3, a regenerant well 168 for a supplemental regenerant fluid is also located in the reservoir 150. Although it is located in the reservoir 150, unlike the brine well 160, the regenerant well 168 is isolated from the reservoir and is not in fluid communication with the regeneration solution. The regeneration well forms an isolated reservoir of a separate regeneration fluid. A cap 170 normally covers the top of the regenerant well to inhibit contamintation by foreign material.

In the preferred embodiment, a predetermined amount of the supplemental regenerant fluid is drawn from the regenerant well 168 during a regeneration cycle and is injected into the brine or regeneration solution at the conclusion of the regeneration cycle. The apparatus for achieving this feature includes an inlet assembly 180 which includes a filtering screen 182 mounted below a set of radially extending arms 184 which serve to locate the filter near the center of the regenerant well 168. The assembly 180 also includes a ball check valve 186 and associated fitting 188. The assembly is disposed at or near the bottom of the regeneration well.

A conduit 190 extends upwardly and is connected to a pumping assembly 192. In particular, the pump assembly 192 includes upper and lower housing members 194, 196 and an elastomeric diaphragm 198 positioned and sealingly clamped between the two housing members. The diaphragm divides the pump into upper and lower chambers 194a, 196a (corresponding to elements 66, 64 in FIG. 1). It should be noted that the pumping assembly 192 shown in FIG. 3 is inverted from the position shown in FIG. 1. The orientation shown in FIG. 3 enables the pump assembly 192 to be disposed inside the tank 150 and enclosed by the tank cover 151.

The conduit 190 is connected to the upper chamber 194 by a T-fitting 200. The T-fitting 200 is also connected to a check valve 202 by a conduit 204. In the disclosed embodiment the check valve 202 is of the "duck bill" variety. However it should be noted that a balltype check value or other check value can also be used. As indicated by the dot-dash line 206, the check value 202 is connected to a vertically extending tube 208, mounted in the regeneration solution reservoir 150. The tube 208 extends into the brine reservoir and is in communication with the brine or regeneration solution.

In operation, the check value 186 located in the inlet assembly 180 allows regenerant fluid flow from the regenerant well 168 into the upper chamber 194a (chamber 66 in FIG. 1) of the pumping assembly 192. When the supplemental regenerant fluid is expelled by the upper chamber 194a (upon pressurization of the lower chamber 196a), the ball check valve 186 closes to prevent return flow. The check valve 202 opens to allow the expelled fluid to be injected into the inlet tube 208.

The brine conduit 164 is connected to the lower chamber 196a (chamber 64 in FIG. 1) by a T-fitting 210. The T-fitting 210 is connected to the control valve assembly 114 (shown in FIG. 2) by a brine supply conduit 220 (indicated by the reference character 52 in FIG. 1).

As discussed above, during a regeneration cycle, as for example when the tank assembly 112 is being regenerated, softened water is communicated (via valve 32 shwon in FIG. 1) to a venturi 34 (also shown in FIG. 1). The flow of water through the venturi draws regeneration solution from the brine well through the conduits 164, 220 (conduit 36 in FIG. 1). When a predetermined amount of the regeneration solution is drawn from the reservoir 150, the brine valve 162 closes. The continued flow of softened water through the venturi 34 develops a suction pressure which causes the diaphragm 198 to move downwardly (as viewed in FIG. 3) and contract the lower chamber 196a. The attendant expansion of the upper chamber 194a causes regeneration fluid in the regeneration well 168 to be drawn into the upper chamber 194a through the conduit 190 and check valve 186. The amount of the solution drawn corresponds to the change in volume of the upper chamber 194a. The check valve 202 prevents air from being drawn into the conduit 204.

At the conclusion of the regeneration cycle, the flow of softened water through the tank asssembly 112 is terminated by closing the drain valve 44 (shown in FIG. 1). When the flow path through the tank is interrupted, the venturi 34 and hence the brine conduits 220, 164 (conduits 36 in FIG. 1) are pressurized and a replenishment of the brine reservoir 150 begins. The pressurization of the brine conduit exerts an expansion force in the lower chamber 196a and causes the diaphragm to expand upwardly, expanding the volume of the lower chamber while concurrently decreasing the volume of the upper chamber. This causes at least a portion of the regenerant fluid stored in the upper chamber 194a to be expelled into the conduit 204. Since the check valve 186 prevents return flow of the regenerant fluid into the regeneration well 168, the check valve 202 opens to allow the expelled fluid to be injected into the tube 208. From there it enters and mixes with the brine solution to form a composite regeneration solution in the reservoir 150.

It should be apparent that the introduction of the supplementary regeneration fluid occurs automatically at the conclusion of each regeneration cycle and is achieved without the use of externally powered controls. The apparatus, being relatively uncomplicated, enables a homeowner to treat problem water which in the past was precluded by the high cost of equipment.

The disclosed apparatus when used with appropriate iron filter material and water softening resins can effectively remove both ferric and ferrous iron from the water supply and in addition adjust a low pH upwardly to a neutral range of 6.8–8.0.

Various water softening resins and iron filter materials can be utilized in the system. As an example, for a low pH water supply having high amounts of undissolved and dissolved iron, the ion exchange resin may be an acrylic based, weak acid carboxylic resin. A resin of this type is sold by the Rohm and Haas Company under the trademark AMBERLITE. For regeneration, in addition to the standard brine solution, a supplemental regenerant is required. The composition of a supplemental regenerant that performs satisfactorily is disclosed in U.S. Pat. No. 4,116,890. Supplemental regeneration compositions other than that described in the patent are also possible and contemplated by the present invention. It should be understood that the quantity of the regenerant fluid added to the brine reservoir at the conclusion of each regeneration cycle can be adjusted by selectively sizing the pump chambers 194, 196 and/or alternately by adjusting the concentration of the supplemental regenerant fluid in the regeneration well 138.

Various materials can also serve as the iron filter media in a lower tank. An example of such a material that is found to produce satisfactory results is known as 3M brand hollow macrospheres sold by the 3M Company. It is believed that other materials can serve as an iron filter media.

In the preferred embodiment, a floating filter media is used in the lower tank. As described earlier, when a tank assembly is on-line, service is "upflow". Regeneration is conducted in a counterflow or downflow direction. Referring to FIG. 2, water to be treated enters the lower tank 110b by way of the riser tube 132. The water travels upwardly through the filter tank 110b and then enters the resin tank 110a. During operation, the floating filter media rises to the top of the lower tank 110b and traps undissolved iron and other solids carried by the water and prevents the material from entering the upper tank. When the tank assembly 110 is regenerated, the regeneration solution and wash water enters at the top of the upper tank 110a and travels downwardly through both tanks 110a and 110b, leaving the lower tank 110b through the riser tube. This downward flow of regeneration solution and wash water flushes the accumulated, undissolved iron (and other solids) from the floating filter media and carries it out of the tank and discharges it to a drain.

The use of a floating filter media thus enhances the filtering capability of the system. When the tank is on line, filter media congregates at the top of the tank to inhibit the undissolved iron from entering the resin tank 110a. During down flow regeneration and wash, the accumulated iron is easily dislodged from the media and flushed from the system.

Although the invention has been described with a certain degree of particularity, it should be understood that those skilled in the art can make various changes to it without departing from the spirit or scope of the invention as hereinafter claimed.

I claim:

1. A water treatment apparatus, comprising:
   (a) tank means defining a resin compartment and a filter compartment in serial fluid communication;
   (b) a reservoir including means for generating a predetermined quantity of brine solution;
   (c) control valve means for controlling the communication of the tank means with the reservoir, including means for drawing solution from said reservoir during a regeneration cycle and delivering it to said tank means;
   (d) means for injecting a predetermined quantity of a supplemental regenerant fluid into said reservoir, for intermixing with said brine solution to produce a composite regeneration solution, said means including:
     (i) a vessel containing said supplemental regenerant fluid;
     (ii) conduit means communicating with said vessel and said reservoir;
     (iii) automatic pump means driven by said solution drawing means and operative to extract a predetermined quantity of said supplemental regenerant fluid and to transfer it to said reservoir to be mixed with said brine solution to produce said composite regeneration solution.

2. The apparatus of claim 1 wherein said tank means comprises individual tanks stacked vertically, one of said tanks defining said resin compartment and the other of said tanks defining said filter compartment.

3. The apparatus of claim 1 wherein said pump means comprises a chamber including an expansible member, one side of said member being in fluid communication with said solution drawing means and another side of said member being in fluid communication with said vessel.

4. A water softening apparatus comprising:
   (a) structure defining a resin compartment containing an ion exchange resin and a filter compartment, said compartments located in serial fluid communication and defining an inlet for receiving water to be treated and an outlet for discharging treated water after passing through said structure;

(b) a solution reservoir including means for generating a predetermined quantity of brine solution;

(c) control valve means for controlling the fluid communication of said reservoir with said structure including conduit means for communicating solution from said reservoir to said structure during a predetermined operating cycle and for conveying water from said tank to said reservoir during another cycle;

(d) means for adding a predetermined quantity of a supplemental regenerant fluid into said reservoir including:
  (i) a vessel containing said regenerant fluid;
  (ii) conduit means communicating with said vessel and said reservoir;
  (iii) expansible chamber means operative to expand during said one operating cycle thereby extracting a predetermined quantity of supplemental regenerant fluid from said vessel and operative to contract substantially near the end of said one cycle to thereby expel said supplemental regenerant fluid into said solution reservoir to be mixed with said brine solution to produce a composite regeneration solution.

5. A water softening apparatus, comprising;
(a) two serially connected tanks, one of said tanks containing ion exchange resin, the other of said tanks containing an iron filter;
(b) said tanks being stacked vertically such that during a water treating cycle, said one tank is downstream of said other tank;
(c) a reservoir of regeneration solution for regenerating said ion exchange resin in said one tank, during a regeneration cycle;
(d) control valve means for controlling the communication of said solution reservoir with said tank including a conduit and means for drawing solution from said reservoir through said conduit and delivering it to said tank, during a regeneration cycle;
(e) pump means driven by said drawing means, for injecting a predetermined quantity of a supplemental regenerant fluid into said solution reservoir including:
  (i) a vessel containing said regenerant fluid;
  (ii) metering means including a conduit for extracting a predetermined quantity of said supplemental regenerant fluid from said vessel and transferring it to said solution reservoir after a predetermined quantity of solution is drawn from said reservoir during a regeneration cycle.

6. A fluid treatment apparatus, comprising:
(a) tank means defining an inlet for fluid to be treated and an outlet for discharing treated fluid, said tank means including fluid treatment material for treating said fluid as it travels through said tank means;
(b) valve means for controlling the flow of fluid to be treated through said tank means and for regenerating said treatment material;
(c) a reservoir of regeneration solution including means for receiving constituent components of said solution and for co-mingling said constituents with water to provide a predetermined quantity of said regeneration solution;
(d) conduit means connecting said valve means with said reservoir of regeneration solution;

(e) a source of supplemental regenerant fluid including pump means operated by pressures in said conduit means, for transferring a predetermined amount of said supplemental regenerant fluid from said source to said regeneration solution reservoir at predetermined intervals to produce a composite regeneration solution.

7. The apparatus of claim 6 wherein said pump means for transferring includes an accumulating means for accumulating a predetermined amount of said supplemental regenerant fluid and means for discharging said accumulated regenerant fluid to said regeneration solution reservoir.

8. The apparatus of claim 7 wherein said accumulating means includes a pumping assembly comprising upper and lower chamber members sealingly clamping an elastomeric diaphragm.

9. The apparatus of claim 8 wherein said conduit means includes a conduit connecting said valve means with said regeneration solution reservoir and said pump means accumulates said predetermined amount of said supplemental regenerant fluid in response to a suction pressure developed in said conduit and discharges said accumulated supplemental regenerant fluid in response to pressurization of said conduit.

10. The apparatus of claim 6 wherein said source of supplemental regenerant fluid comprises an isolated well disposed in said regenerant solution reservoir.

11. The apparatus of claim 6 wherein said tank means comprises a pair of vertically standing, serially connected tanks, one of said tanks containing a water softening resin the other of said tanks comprising an iron filter media.

12. The apparatus of claim 11 further including a riser tube extending from a valve means connnector downwardly through both tanks and defining an opening near the bottom of a lower tank.

13. A water treatment apparatus comprising:
(a) structure defining a water treatment bed containing material through which water to be treated is passed;
(b) means for regenerating said bed including a supply conduit for conveying regeneration solution to said bed from a reservoir, said reservoir including means for generating a predetermined quantity of brine solution;
(c) a source of supplemental regenerant fluid;
(d) pump means for transferring a predetermined amount of said supplemental regenerant fluid from said source to said regeneration solution reservoir at predetermined intervals whereby a composite regeneration solution is produced, said pump means including fluid driving means responsive to pressurization and depressurization of said regeneration solution supply conduit.

14. The apparatus of claim 13 wherein said pump means comprises an accumulator assembly defined by a pair of housing members and an elastomeric diaphragm captured between said housing members, one of said housing members being in fluid communication with said regeneration solution supply conduit and the other of said housing memebers being in fluid communication with said supplemental regenerant fluid source.

15. A water treatment apparatus, comprising:
(a) a tank assembly containing water treatment material through which water to be treated is passed;
(b) means for regenerating water treatment material in said tank assembly, said means including:

(i) a vessel defining a regeneration solution reservoir;

(ii) a regeneration solution well mounted within said vessel and communicating with said reservoirl (iii) an isolated compartment containing a supplemental regenerant fluid mounted within said vessel;

(iv) a pump assembly including means responsive to pressurization and depressurization of a regeneration solution supply conduit communicating with said regeneration well, disposed within said vessel and operative to transfer a predetermined quantity of said supplemental regenerant fluid from said compartment to said regeneration solution reservoir prior to regenerating said water treatment material.

16. A water treatment apparatus, comprising:

(a) a tank including a compartment containing water treatment material;

(b) a reservoir of regeneration solution;

(c) a control valve for controlling the communication of said solution reservoir with said tank including a supply conduit and a fluid aspirator communicating with said conduit;

(d) said aspirator being operative during at least a portion of a regeneration cycle, to subject said conduit to a suction pressure whereby solution is drawn into said control valvel from said reservoir;

(e) said control valve further including means for pressurizing said aspirator supply conduit;

(f) a pump means comprising a housing including an elastomeric member, one side of said member defining one expansible chamber in fluid communication with said supply conduit and another side of said member defining another expansible chamber in fluid communication with a fluid vessel;

(g) said pump means being operative such that when said aspirator becomes effective, said one chamber responding to said suction pressure in said supply conduit contracts and said other expansible chamber communicating with said fluid vessel expands whereby fluid from said vessel is drawn into said other chamber;

(h) said pump being further operative upon pressurization of said supply conduit, to expand said first chamber to expand thereby expelling said fluid from said other chamber and into a reservoir conduit that communicates with said reservoir.

17. The apparatus of claim 16 wherein said reservoir contains a brine solution.

18. The apparatus of claim 17 wherein said fluid vessel contains a supplemental regenerant fluid which upon co-mingling with said brine solution in said reservoir produces a composite regeneration solution.

* * * * *

UNITED STATES PATENT AND TRADEMARK OFFICE
CERTIFICATE OF CORRECTION

PATENT NO. : 4,693,814
DATED : September 15, 1987
INVENTOR(S) : Keith E. Brown

It is certified that error appears in the above-identified patent and that said Letters Patent is hereby corrected as shown below: Title page:

```
Abstract, line 6, "resing" should be --resin--;
Column 5, line 15, "contol" should be --control--;
Column 7, line 51, "wall" should be --well--;
Column 8, line 33, "value", both instances, should be --valve--;
Column 8, line 35, "value" should be --valve--;
Column 8, line 39, "value" should be --valve--;
Column 12, line 62, "memebers" should be --members--;
Column 13, line 5, "reservoirl" should be --reservoir;--
Column 14, line 2, "valvel" should be --valve--.
```

Signed and Sealed this

Twenty-ninth Day of December, 1987

Attest:

DONALD J. QUIGG

*Attesting Officer*   *Commissioner of Patents and Trademarks*